(12) United States Patent
Cranna

(10) Patent No.: US 6,601,495 B2
(45) Date of Patent: Aug. 5, 2003

(54) STRUCTURAL SAW BLADE

(75) Inventor: Mark T. Cranna, Somers, CT (US)

(73) Assignee: American Saw & Mfg. Co., Inc., East Longmeadow, MA (US)

( * ) Notice: Subject to any disclaimer, the term of this patent is extended or adjusted under 35 U.S.C. 154(b) by 0 days.

(21) Appl. No.: 09/886,627

(22) Filed: Jun. 21, 2001

(65) Prior Publication Data

US 2002/0029679 A1 Mar. 14, 2002

Related U.S. Application Data

(60) Provisional application No. 60/218,897, filed on Jul. 18, 2000.

(51) Int. Cl.$^7$ .............................................. B27B 33/02
(52) U.S. Cl. ............................ 83/848; 83/846; 83/661; 83/847
(58) Field of Search .......................... 83/835, 837, 846, 83/847, 848, 849, 850, 853, 854, 661, 851

(56) References Cited

U.S. PATENT DOCUMENTS

| | | |
|---|---|---|
| 552,370 A | 8/1895 | Holley |
| 820,969 A | 5/1906 | Grelck |
| 1,955,137 A | 4/1934 | Lee ............................ 143/143 |
| 2,071,618 A | 2/1937 | Ferrari et al. ................ 143/140 |
| 2,126,382 A | 8/1938 | Goff et al. ................... 143/140 |
| 3,292,674 A | 12/1966 | Turner ......................... 143/133 |
| 4,179,967 A | 12/1979 | Clark ............................ 83/846 |
| 4,232,578 A | 11/1980 | Stellinger et al. ............. 83/661 |
| 4,292,871 A | 10/1981 | Neumeyer et al. ............ 83/661 |
| RE31,433 E | 11/1983 | Clark ............................ 83/846 |
| 4,688,458 A | 8/1987 | Krilov .......................... 83/661 |
| 4,784,033 A | 11/1988 | Hayden et al. ................ 83/661 |
| 5,018,421 A | 5/1991 | Lucki et al. .................. 83/835 |
| 5,501,129 A | 3/1996 | Armstrong et al. ........... 83/848 |
| 5,603,252 A | 2/1997 | Hayden, Sr. .................. 83/851 |
| 5,606,900 A | 3/1997 | Stoddard ...................... 83/846 |
| 5,868,058 A | 2/1999 | Senegas ....................... 83/846 |

(List continued on next page.)

FOREIGN PATENT DOCUMENTS

| | | |
|---|---|---|
| JP | 2616924 | 6/1997 |
| JP | 11-19821 | 1/1999 |

OTHER PUBLICATIONS

International Search Report for International Application No. PCT/US01/22655 Sep. 24, 2001.

Primary Examiner—Paul T. Sewell
Assistant Examiner—Thanh P Duong
(74) Attorney, Agent, or Firm—Cummings & Lockwood LLC

(57) ABSTRACT

A structural band saw blade is provided having a cutting edge defined by a plurality of teeth spaced relative to each other, and a back edge located on an opposite side of the blade relative to the cutting edge. Each tooth of the band saw blade defines a tip, a rake face formed on one side of the tip, a primary clearance surface formed on the opposite side of the tip relative to the rake face, a secondary clearance surface formed on the opposite side of the primary clearance surface relative to the tip, and a tertiary clearance surface formed on the opposite side of the secondary clearance surface relative to the first clearance surface. The primary clearance surface defines a first acute relief angle, the secondary clearance surface defines a second acute relief angle less than the first acute relief angle, and the tertiary clearance surface defines a tertiary acute relief angle greater than the first and second relief angles. A rake face protrusion is formed on the opposite side of the rake face relative to the tip, and extends over one end of a weld zone. The rake face protrusion projects outwardly relative to a plane defined by the rake face, and the secondary and tertiary clearance surfaces project outwardly on the opposite side of the tooth relative to the rake face protrusion. One or both of the secondary and tertiary clearance surfaces extends over the weld zone on the opposite side of the tooth relative to the rake face protrusion to thereby form an increased tooth thickness at the weld zone and prevent tooth strippage. The teeth of the saw blade define a variable level height and set.

42 Claims, 4 Drawing Sheets

U.S. PATENT DOCUMENTS

| | | |
|---|---|---|
| 5,884,547 A | 3/1999 | Carlsen et al. |
| 5,896,800 A | 4/1999 | Curtsinger et al. |
| 5,946,985 A | 9/1999 | Carlsen et al. |
| 6,003,422 A | 12/1999 | Holston |
| 6,035,844 A | 3/2000 | Otani et al. |
| 6,158,324 A | 12/2000 | Kullmann et al. ............ 83/848 |
| 6,167,792 B1 * | 1/2001 | Korb et al. ................... 83/835 |
| D438,549 S | 3/2001 | Tsujimoto .................. D15/134 |
| 6,276,248 B1 * | 8/2001 | Cranna ........................ 83/846 |

* cited by examiner

STRUCTURAL SAW BLADE

This application claims the benefit of Provisional Application No. 60/218,897, filed Jul. 18, 2000.

FIELD OF THE INVENTION

The present invention relates to saw blades, and more particularly, to saw blades particularly suitable for cutting structural steel, such as angle irons, I-beams, tubing and the like.

BACKGROUND INFORMATION

Structural band saw blades are used to cut structural steel, such as angle irons, I-beams, tubing and the like. In these applications, the band saw blades are typically run at relatively high speeds on the order of about 300 surface feet per minute, with relatively little, if any, coolant. Typically, the coolant is sprayed in a mist onto the blade at a location about two to three feet in advance of the inlet to the cut. Certain prior art structural band saw blades have tended to allow excessive collection of chip curls in the gullets of the blades which tend to be forced back into the cutting zone and, most importantly, into direct contact with the primary rake face. As a result, there is an increase in both the cutting forces and overall chip contact length with the rake face which, in turn, cause the amount of heat transferred into the blade to increase and adversely effect overall blade life. In some instances, the heat build-up is sufficient to weld chip curls to the cutting edges of the blades and, in turn, fracture the cutting edges when the chip curls are broken away.

Cutting structural steels, as opposed to solid blocks, for example, involves intermittent cutting, and the degree of such intermittent cutting depends upon the shape and/or configuration of the work pieces being cut. Intermittent cutting with prior art structural band saw blades causes substantial chatter and vibration in the blades, and unbalanced loading among the teeth of the blades. This, in turn, leads to higher rates of tooth strippage in comparison to other types of cutting operations.

Accordingly, it is an object of the present invention to overcome one or more of the above-described drawbacks and disadvantages of the prior art.

SUMMARY OF THE INVENTION

The present invention is directed to a structural saw blade, such as a band saw blade, comprising a cutting edge defined by a plurality of teeth spaced relative to each other. Each tooth of the saw blade includes a tip, a rake face formed on one side of the tip, and a primary clearance surface formed on the opposite side of the tip relative to the rake face and defining a primary acute relief angle. A secondary clearance surface is formed on the opposite side of the primary clearance surface relative to the tip, and the secondary clearance surface defines a secondary acute relief angle that is less than the primary acute relief angle. In addition, a tertiary clearance surface is formed on the opposite side of the secondary clearance surface relative to the first clearance surface, and defines a tertiary acute relief angle that is greater than the primary and secondary relief angles.

A weld zone of each tooth is formed between the tip and the back edge of the saw blade and extends in the elongated direction of the blade from approximately one side of the tooth to the other. A rake face protrusion is formed on the opposite side of the rake face relative to the tip, and extends over one end of the weld zone. The rake face protrusion projects outwardly relative to a plane defined by the rake face, and the secondary and tertiary clearance surfaces project outwardly on the opposite side of the tooth relative to the rake face protrusion. At least one of the secondary and tertiary clearance surfaces extends over the weld zone on the opposite side of the tooth relative to the rake face protrusion to thereby form an increased tooth thickness at the weld zone.

In accordance with a preferred embodiment of the present invention, the saw blade is a structural band saw blade, the primary acute relief angle is within the range of approximately 20° through approximately 35° relative to a plane defined by a back edge of the blade, and most preferably is approximately 27° relative to the back edge of the blade; the secondary acute relief angle is within the range of approximately 5° through approximately 20° relative to a plane defined by the back edge of the blade, and most preferably is approximately 15° relative to the back edge of the blade; and the tertiary acute relief angle is within the range of approximately 40° through approximately 55° relative to a plane defined by the back edge of the blade, and most preferably is approximately 46.5° relative to the back edge of the blade.

Also in accordance with a preferred embodiment of the present invention, the rake face protrusion defines a surface area of maximum projection relative to a plane of the rake face that is spaced at a depth below a cutting plane of the tip of an unset tooth within the range of approximately 0.030 inch through approximately 0.100 inch, and most preferably within the range of approximately 0.045 inch through approximately 0.075 inch. In addition, the rake face protrusion preferably defines a thickness normal to a plane of the rake face within the range of approximately 0.005 inch through approximately 0.060 inch.

Also in accordance with a preferred embodiment of the present invention, the blade defines extended pitch patterns, preferably at least approximately 9 teeth per pitch pattern, with set patterns within each pitch pattern. In addition, the preferred embodiments of the band saw blades of the present invention preferably define variable level height and set patterns within each pitch pattern.

One advantage of the saw blades of the present invention is that the rake face protrusion, in combination with the locations of the secondary and tertiary clearance surfaces as defined by the respective clearance angles, significantly increase the width or thickness of each tooth at the weld zone in comparison to prior art structural saw blades, and thereby substantially improve the resistance to tooth strippage as encountered with such prior art blades. Yet another advantage of the preferred embodiments of the present invention is that the variable level height and set of the teeth provide a relatively deep and narrow cut for each tooth operating to reduce the torque loads on the teeth in comparison to prior art saw blades, and the extended pitch patterns defining relatively uniform distances between teeth of like set direction further facilitate reducing noise and vibration to thereby enhance blade life in comparison to prior art band saw blades.

Other advantages of the present invention will become readily apparent in view of the following detailed description of preferred embodiments and accompanying drawings.

DETAILED DESCRIPTION OF THE PREFERRED EMBODIMENTS

Figure 1:
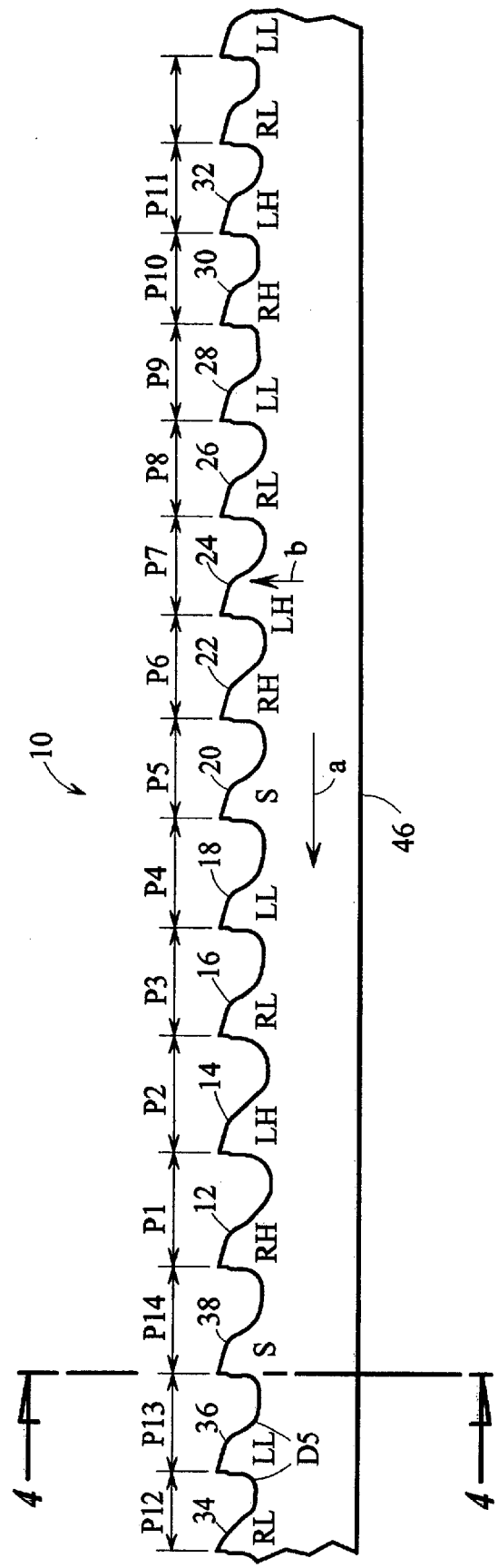
FIG. 1 is somewhat schematic, side elevational view of a structural band saw blade embodying the present invention.
Figure 2:
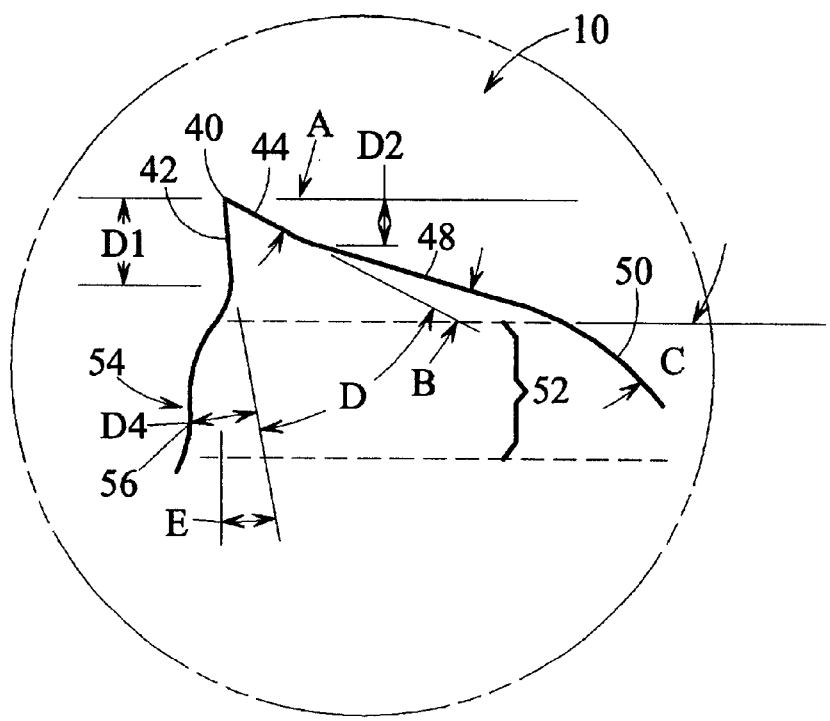
FIG. 2 is an enlarged, partial side elevational view of the band saw blade of FIG. 1 illustrating in further detail a typical tooth configuration of the band saw blade.

In FIGS. 1 and 2, a structural band saw blade embodying the present invention is indicated generally by the reference numeral 10. The band saw blade 10 defines a cutting direction indicated by the arrow "a", and a feed direction indicated by the arrow "b". The band saw blade 10 comprises a plurality of recurrent or repetitive patterns of teeth defining a 14-tooth pitch pattern. Each pitch pattern is defined by a recurrent group of 14 successive teeth indicated by the reference numerals 12, 14, 16, 18, 20, 22, 24, 26, 28, 30, 32, 34, 36 and 38. As shown in FIG. 1, each tooth defines a respective pitch or tooth spacing P1 through P14. In the preferred embodiments of the present invention, and as indicated in FIG. 1, the pitch or tooth spacing is measured between the tips of adjacent teeth. However, as may be recognized by those skilled in the pertinent art based on the teachings herein, the pitch or tooth spacing may be measured between any of numerous other corresponding points between adjacent teeth.

Figure 3:
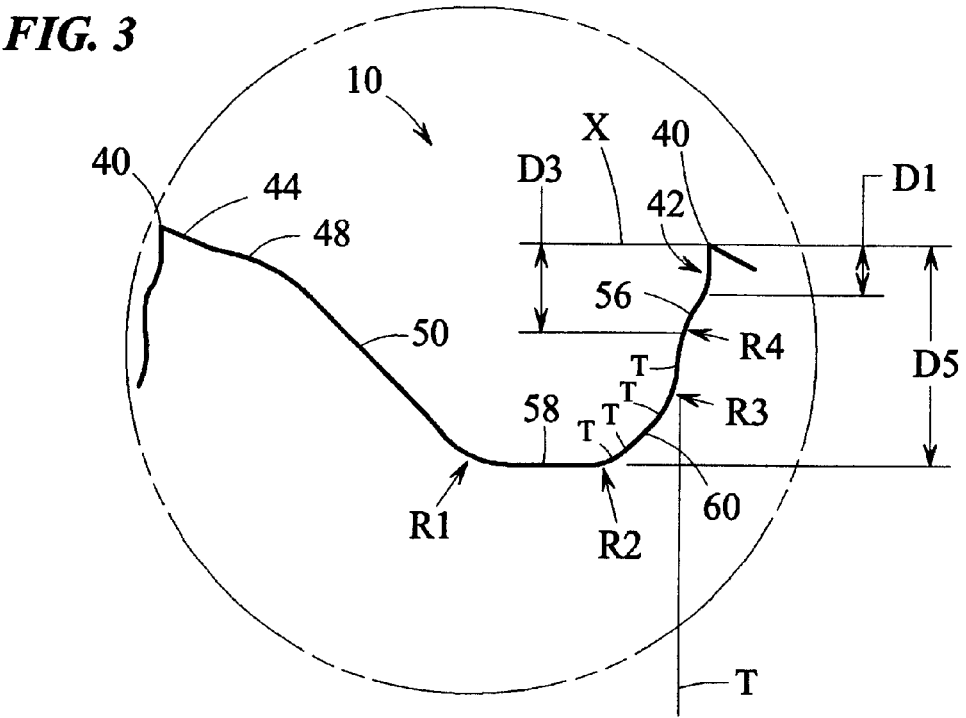
FIG. 3 is an enlarged, partial side elevational view of the band saw blade of FIG. 1 further illustrating a typical tooth configuration of the band saw blade.

As shown typically in FIGS. 2 and 3, each tooth of the band saw blade 10 includes a tip 40, a rake face 42 formed on one side of the tip, and a primary clearance surface 44 formed on the opposite side of the tip relative to the rake face and defining a primary acute relief angle "A" relative to a back edge 46 of the blade. A secondary clearance surface 48 is formed on the opposite side of the primary clearance surface 44 relative to the tip 40, and the secondary clearance surface defines a secondary acute relief angle "B" relative to the back edge 46 of the blade that is less than the primary acute relief angle. In addition, a tertiary clearance surface 50 is formed on the opposite side of the secondary clearance surface 48 relative to the first clearance surface 44, and defines a tertiary acute relief angle "C" relative to the back edge 46 of the blade that is greater than each of the primary and secondary relief angles.

As indicated in broken lines in FIG. 2, an electron beam weld zone 52 of each tooth is formed between the tip 40 and the back edge 46 of the saw blade and extends in the elongated direction of the blade from approximately one side of the tooth to the other. A rake face protrusion 54 is formed on the opposite side of the rake face relative to the tip 40, and extends over one end of the weld zone 52. As shown typically in FIGS. 2 and 3, the rake face protrusion 54 projects outwardly relative to a plane defined by the rake face 42, and the secondary and tertiary clearance surfaces 48 and 50, respectively, project outwardly on the opposite side of the tooth relative to the rake face protrusion. As can be seen, at least one of the secondary and tertiary clearance surfaces 48 and 50, respectively, extends over the weld zone 52 on the opposite side of the tooth relative to the rake face protrusion 54 to thereby form an increased tooth width or thickness at the weld zone.

In accordance with the present invention, the primary acute relief angle A is within the range of approximately 20° through approximately 35° relative to a plane defined by the back edge 46 of the blade; the secondary acute relief angle B is within the range of approximately 5° through approximately 20° relative to a plane defined by the back edge 46 of the blade; and the tertiary relief angle C is within the range of approximately 40° through approximately 55° relative to a plane defined by the back edge 46 of the blade. In the illustrated embodiment, the primary acute relief angle A is approximately 27°, the secondary acute relief angle B is approximately 15°, and the tertiary acute relief angle is approximately 46.5°. However, as may be recognized by those skilled in the pertinent art based on the teachings herein, these angles may be adjusted as desired in accordance with the requirements of a particular saw blade or application. In addition, the back edge 46 of the band saw blades of the invention may be stepped or otherwise may define irregular-shaped surface sections as taught, for example, in commonly assigned U.S. Pat. No. 4,423,653, which is hereby incorporated by reference as part of the present disclosure. In such instances, the angles defined herein with reference to the back edge may be defined with reference to the horizontal or planar portions of such modified back edges, or may be defined with reference, for example, to the plane extending between the tips of the unset teeth.

As also shown in FIG. 2, each tooth defines an included tip angle "D" formed between the rake face 42 and the primary clearance surface 44. In accordance with the present invention, the included angle D is within the range of approximately 45° through approximately 65°. In the illustrated embodiment, the included angle D is approximately 55°. However, as may be recognized by those skilled in the pertinent art based on the teachings herein, these angles may be adjusted as desired in accordance with the requirements of a particular saw blade or application.

As shown best in FIG. 2, the rake face defines a length "D" extending between the tip 40 and rake face protrusion 54 which is within the range of approximately 0.010 inch through approximately 0.040 inch. In the illustrated embodiment, the length D1 of the rake face is approximately 0.020 inch.

As also shown in FIG. 2, the secondary clearance surface 48 defines a first end adjacent to the primary clearance surface 44, and a second end adjacent to the tertiary clearance surface 50, and the first end of the secondary clearance surface is spaced at a depth "D2" below a cutting plane "x" of the tip of an unset tooth. In accordance with the present invention, the depth D2 is within the range of approximately 0.010 inch through approximately 0.030 inch. In the illustrated embodiment, the depth D2 is approximately 0.012 inch in order to place this surface at the minimum depth required to avoid wear on this surface during the typical or expected life cycle of the blade.

As shown best in FIG. 3, the rake face protrusion 54 defines a surface area 56 of maximum projection relative to the plane of the rake face 42 that is spaced at a depth D3 below a cutting plane of the tip of an unset tooth. The depth D3 is within the range of approximately 0.030 inch through approximately 0.100 inch, and most preferably is within the range of approximately 0.045 inch through approximately 0.075 inch. In addition, as shown in FIG. 2, the rake face protrusion 54 defines a thickness D4 normal to the plane of the rake face that is preferably within the range of approximately 0.005 inch through approximately 0.060 inch, and most preferably is within the range of approximately 0.010 inch through approximately 0.040 inch.

As also shown in FIG. 2, the rake face defines an acute rake angle "E" relative to a normal to a plane defined by the back edge 46 of the blade, and the acute rake angle is within the range of approximately 5° through approximately 10°. In the illustrated embodiment, the acute rake angle E is approximately 8°. However, as may be recognized by those skilled in the pertinent art based on the teachings herein, these angles may be adjusted as desired in accordance with the requirements of a particular saw blade or application.

As shown best in FIG. 3, each tooth defines a maximum gullet depth D5 between the tip 40 and base 58 of the gullet. As also shown, the base 58 of the gullet defines a flat, and a radius R1 defines the junction between the flat 58 and adjacent end of the tertiary clearance surface 50. A second flat 60 is formed between the base 58 of the gullet and the rake face protrusion 54. As shown in FIG. 3, a radius R2 defines the junction between the base 58 and second flat 60 with points of tangency "T" formed between the radius R2 and each flat. A second radius R3 defines the junction between the second flat 60 and the rake face protrusion 54 with points of tangency "T" formed between the radius R3 and both the second flat and rake face protrusion. The rake face protrusion 54 is further defined by a radius R4 extending between the radius R3 and the base of the rake face 42. Thus, as shown in FIG. 3, the rake face protrusion 54 defines a substantially convex profile at the base of the rake face and formed by the radius R4 projecting outwardly relative to the plane of the rake face. As further shown in FIG. 3, the line of tangency "T'" between the rake face protrusion 54 and the radius R3 is substantially normal to the unset tooth tip plane "x". This preferred orientation provides an optimal geometry for balancing the increased tooth cross-section at the set-bend plane with maximum gullet capacity. A significant advantage of providing increased tooth cross-section at the set-bend plane in accordance with the present invention is to prevent "set collapse" and harmful vibration by increasing tooth stiffness. The gullet capacity provided by the saw blades of the invention is also advantageous in that relatively deep, spacious gullets are necessary to handle occasional excessively wide cross-sections of bundled structural materials. As may be recognized by those skilled in the pertinent art based on the teachings herein, the line of tangency "T'" between the rake face protrusion 54 and the radius R3 need not in all applications be substantially normal to the unset tooth tip plane; however, the line of tangency is preferably with the range of ± approximately 5° relative to the normal. Exemplary dimensions of the pitch and radii R1–R4 for each tooth of the embodiment of the present invention are summarized in the following table:

| Tooth # | Pitch (inch) | R1 (inch) | R2 (inch) | R3 (inch) | R4 (inch) |
|---|---|---|---|---|---|
| 12 | P1 = 0.357 | .069 | .069 | .060 | .047 |
| 14 | P2 = 0.348 | .065 | .065 | .048 | .048 |
| 16 | P3 = 0.338 | .070 | .070 | .040 | .040 |
| 18 | P4 = 0.329 | .062 | .062 | .075 | .036 |
| 20 | P5 = 0.320 | .056 | .056 | .080 | .038 |
| 22 | P6 = 0.311 | .055 | .055 | .075 | .042 |
| 24 | P7 = 0.301 | .050 | .044 | .048 | .054 |
| 26 | P8 = 0.293 | .050 | .044 | .085 | .030 |
| 28 | P9 = 0.284 | .048 | .048 | .070 | .034 |
| 30 | P10 = 0.276 | .045 | .040 | .060 | .030 |

-continued

| Tooth # | Pitch (inch) | R1 (inch) | R2 (inch) | R3 (inch) | R4 (inch) |
|---|---|---|---|---|---|
| 32 | P11 = 0.268 | .042 | .042 | .052 | .040 |
| 34 | P12 = 0.260 | .040 | .040 | .050 | .040 |
| 36 | P13 = 0.301 | .055 | .050 | .052 | .040 |
| 38 | P14 = 0.329 | .060 | .055 | .065 | .043 |

The ratio of the gullet depth D5 to the pitch P (i.e., D5/P) for each tooth is preferably at least about 40% to thereby obtain relatively deep gullets, and most preferably is within the range of about 39% through about 49%. In the illustrated embodiment, the exemplary dimensions of the gullet depth D5 and pitch P (in inches) are as follows:

| Tooth # | Gullet Depth D5 (inches) | Pitch P (inches) | D5/P × 100 (%) |
|---|---|---|---|
| 12 | D5 = 0.159 | P1 = 0.357 | 44% |
| 14 | D5 = 0.155 | P2 = 0.348 | 44% |
| 16 | D5 = 0.143 | P3 = 0.338 | 42% |
| 18 | D5 = 0.138 | P4 = 0.329 | 42% |
| 20 | D5 = 0.135 | P5 = 0.320 | 42% |
| 22 | D5 = 0.132 | P6 = 0.311 | 42% |
| 24 | D5 = 0.127 | P7 = 0.301 | 42% |
| 26 | D5 = 0.122 | P8 = 0.293 | 42% |
| 28 | D5 = 0.120 | P9 = 0.284 | 42% |
| 30 | D5 = 0.120 | P10 = 0.276 | 43% |
| 32 | D5 = 0.120 | P11 = 0.268 | 45% |
| 34 | D5 = 0.120 | P12 = 0.260 | 46% |
| 36 | D5 = 0.127 | P13 = 0.301 | 40% |
| 38 | DS = 0.138 | P14 = 0.329 | 40% |

Figure 4:
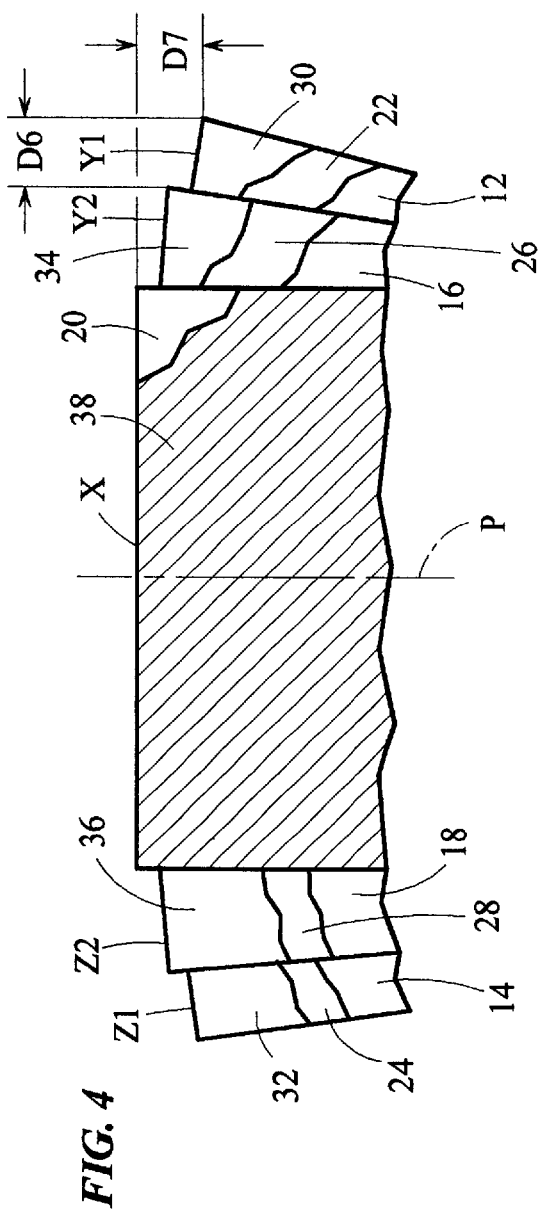
FIG. 4 is a partial cut-away, cross-sectional view of the band saw blade of FIG. 1 taken along line 4—4 of FIG. 1.

Each 14-tooth pitch pattern of the band saw blade 10 defines a five/nine set pattern. Thus, in the preferred embodiment of FIG. 1, a first set pattern is defined by five successive teeth 38, 12, 14, 16 and 18, and a second set pattern is defined by the next nine successive teeth 20, 22, 24, 26, 28, 30, 32, 34 and 36. As shown in FIG. 4, the first set pattern is defined by a first unset leading tooth 38, a primary right set trailing tooth 12, and a primary left set trailing tooth 14, a secondary right set trailing tooth 16 and a secondary left set trailing tooth 18. The second set pattern is defined by a first unset leading tooth 20, a primary right set trailing tooth 22, a primary left set trailing tooth 24, a secondary right set trailing tooth 26, secondary left set trailing tooth 28, a tertiary right set trailing tooth 30, a tertiary left set trailing tooth 32, another right set trailing tooth 34, and another left set trailing tooth 36.

As shown in FIG. 4, the band saw blade 10 preferably defines an "oscillating" pattern of set magnitudes wherein successive teeth of the same set direction are set at different magnitudes in comparison to each other. Accordingly, a first tooth of a particular set direction may be set "heavy", and the successive tooth of like set direction may be set "light", and so on. Accordingly, in the 14 tooth pitch pattern of the currently preferred embodiment, and as also shown in FIG. 1, the oscillating set pattern is as follows: S-RH-LH-RL-LL-S-RH-LH-RL-LL-RH-LH-RL-LL-S- . . . , wherein:
S=unset raker tooth;
RH=right, heavy set tooth;
LH=left, heavy set tooth;
RL=right, light set tooth; and
LL=left, light set tooth.
In the illustrated embodiment of the present invention, the heavy set teeth (i.e., the "RH" or "LH" teeth in FIG. 1) are located below the nominal tooth tip plane of the unset teeth at a depth within the range of approximately −0.004 inch through approximately −0.006 inch, depending upon the respective tooth pitch.

Thus, as shown in FIG. 4, each unset leading tooth 20 and 38 is symmetrical about the plane of symmetry "p" of the band saw blade 10, and defines a cutting edge substantially located within the cutting plane "x" which is approximately perpendicular to the plane of symmetry "p". Each "heavy" right set trailing tooth ("RH") (12, 22, 30) is tilted or set to the right in the drawing relative to the plane of symmetry "p" (when viewed from the cutting direction "a" of the saw blade), and defines a cutting edge substantially located within a cutting plane "y1" tilted or set at a first acute angle relative to the plane of symmetry "p". Each first acute angle is preferably with the range of about 6° through about 20°, and most preferably is about 13°. Each "light" right set trailing tooth ("RL") (16, 26, 34) is tilted or set to the right in the drawing relative to the plane of symmetry "p" (when viewed from the cutting direction "a" of the saw blade), and defines a cutting edge substantially located within a cutting plane "y2" tilted or set at a second acute angle relative to the plane of symmetry "p" that is less than the first acute angle. Each second acute angle is preferably with the range of about 2° through about 12°, and most preferably is about 5°. Similarly, each "heavy" left set trailing tooth ("LH") (14, 24, 32) is tilted or set to the left in the drawing relative to the plane of symmetry "p", and defines a cutting edge substantially located within a cutting plane "z1" tilted or set a first acute angle relative to the plane of symmetry "p". Each first acute angle is preferably with the range of about 6° through about 20°, and most preferably is about 13°. And each "light" left set trailing tooth ("LL") (18, 28, 36) is tilted or set to the left in the drawing relative to the plane of symmetry "p", and defines a cutting edge substantially located within a cutting plane "z2" tilted or set at a second acute angle relative to the plane of symmetry "p" that is less than the first acute angle. Each second acute angle is preferably with the range of about 2° through about 12°, and most preferably is about 5°.

Accordingly, the saw blade of a preferred embodiment defines five unique cutting planes (x, y1, y2, z1, z2) established by a variable level (or height) and angle of the set (referred to herein as a "variable level height and set pattern"). This feature is particularly advantageous with respect to allowing uniform tooth loading and efficient chip formation. In addition, this multi-plane cutting feature provides for more efficient cutting in comparison to prior art structural band saw blades by cutting chips that are both relatively narrow, as defined by the exemplary dimension D6 in FIG. 4, and relatively deep, as defined by the exemplary dimension D7 in FIG. 4. The multi-plane cutting approach exerts variable torque loading or lateral twist on the blade. This result is due primarily to the variable magnitude and direction of the moments created by the cutting forces on the light and heavy set teeth. The variable torque loading has a tendency to minimize and dampen lateral blade movements and thus provides substantial noise and vibration reduction leading to longer blade life.

As indicated above, the pitch of each tooth is the distance in the elongated direction of the saw blade between corresponding points of the respective tooth and the preceding tooth in the cutting direction of the saw blade. Thus, as shown in FIG. 1, the pitch may be measured between the tips of adjacent teeth. The accumulated pitch of a tooth, on the other hand, is the sum of the pitch distances between the respective tooth and the nearest preceding tooth of the same or like set direction in the cutting direction of the saw blade. Thus, for example, with reference to FIG. 1, the accumulated pitch of the unset leading tooth 20 is the sum of the pitch distances P14, P1, P2, P3 and P4, i.e., the sum of the pitch distances between the unset leading tooth 20 and the nearest preceding unset leading tooth (38) in the cutting direction "a" of the saw blade.

Preferably, for extended set patterns that might otherwise result in relatively inefficient tooth loading (>about 5 teeth), the ratio of pitch to accumulated pitch for each tooth of like set direction within each set pattern increases from one tooth to the next in the direction opposite the cutting direction of the saw blade for distributing the chip load over the teeth of the saw blade, in accordance with the teachings of co-pending U.S. patent application Ser. No. 09/435,108 entitled "Band Saw Blade Having Reduced Noise And Uniform Tooth Loading Characteristics", now U.S. Pat. No. 6,276,248, which is assigned to the Assignee of the present invention, and is hereby expressly incorporated by reference as part of the present disclosure. Thus, the ratio of pitch to accumulated pitch is greater for each secondary tooth than for the corresponding primary tooth, is greater for each tertiary tooth than for the corresponding secondary and primary teeth, and so on. In addition, there is a relatively rapid transition from the smallest to the largest pitch within each pitch pattern. The pitch, accumulated pitch, and ratio of pitch to accumulated pitch of each tooth in the illustrated embodiment of FIG. 1 are set forth in the following table:

| Tooth # | Tooth Type | Pitch Distance (") | Pitch (TPI) | Accum. Pitch | Ratio P/AP |
|---|---|---|---|---|---|
| 12 | S1 | P1 = 0.357 | 2.801 | 2.669 | 0.134 |
| 14 | RH | P2 = 0.348 | 2.874 | 1.595 | 0.218 |
| 16 | LH | P3 = 0.338 | 2.955 | 1.673 | 0.202 |
| 18 | RL | P4 = 0.329 | 3.040 | 1.701 | 0.193 |
| 20 | LL | P5 = 0.320 | 3.125 | 1.692 | 0.189 |
| 22 | S2 | P6 = 0.311 | 3.215 | 1.646 | 0.189 |
| 24 | RH | P7 = 0.301 | 3.322 | 1.599 | 0.188 |
| 26 | LU | P8 = 0.293 | 3.413 | 1.554 | 0.189 |
| 28 | RL | P9 = 0.284 | 3.521 | 1.509 | 0.188 |
| 30 | LL | P10 = 0.276 | 3.623 | 1.465 | 0.188 |
| 32 | RH | P11 = 0.268 | 3.731 | 1.121 | 0.239 |
| 34 | LU | P12 = 0.260 | 3.846 | 1.088 | 0.239 |
| 36 | RL | P13 = 0.301 | 3.322 | 1.105 | 0.272 |
| 38 | LL | P14 = 0.329 | 3.040 | 1.158 | 0.284 |

As may be recongnized by those of ordinary skill in the pertinent art based on the teachings herein, the specific pitch and accumulated pitch dimensions set forth in the preceding table are exemplary only, and any of numerous different dimensions may be on the particular design criteria or other desired characteristics of the band saw blades within the teachings and scope of the present invention. For example, the gullet area of each tooth may be directly proportional to the accumulated pitch distance between that tooth and the next preceding tooth of like set direction, as disclosed in commonly-assigned U.S. patent application Ser. No. 08/967, 279, now U.S. Pat. No. 6,003,422, which is hereby expressly incorporated by reference as part of the present disclosure.

Also in accordance with the present invention, and as illustrated in the table above, each tooth defines a different pitch than a plurality of other teeth within the respective set pattern, and preferably, defines a different pitch than a plurality of other teeth within the respective pitch pattern. As shown in the table above, the 14 tooth pitch pattern of the present invention defines 12 unique pitch distances. One of the advantages of this feature of the present invention is that during cutting operations, each tooth entering or exiting the workpiece generates a different forcing frequency than every other tooth simultaneously entering or exiting the workpiece, or the other teeth successively entering or exiting the workpiece, thus substantially reducing noise and vibration during cutting operations, and facilitating blade break in. The forcing frequency ("f") of each tooth may be determined based on the band speed ("BS") and the pitch ("P") in accordance with the following equation: f=BS÷5P, wherein f is in cycles/second, BS is in feet/minute, and P is in inches. Thus, by providing each tooth with a different pitch than a plurality of other teeth within the pitch pattern, each tooth will generate a different forcing frequency upon cutting a workpiece. Accordingly, each tooth entering or exiting the workpiece during cutting operations typically will generate a different forcing frequency (f) than every other tooth simultaneously entering or exiting the workpiece, and/or successively entering or exiting the workpiece.

One advantage of the relatively large pitch patterns of the currently preferred embodiments of the present invention (at least about 9 teeth) is that there is less distance between teeth in the same cutting plane in comparison to prior art saw blades, particularly structural band saw blades, and the teeth are achieving approximately the same depth of cut, thus further facilitating uniform tooth loading from one tooth to the next and improved blade life.

Figure 5:
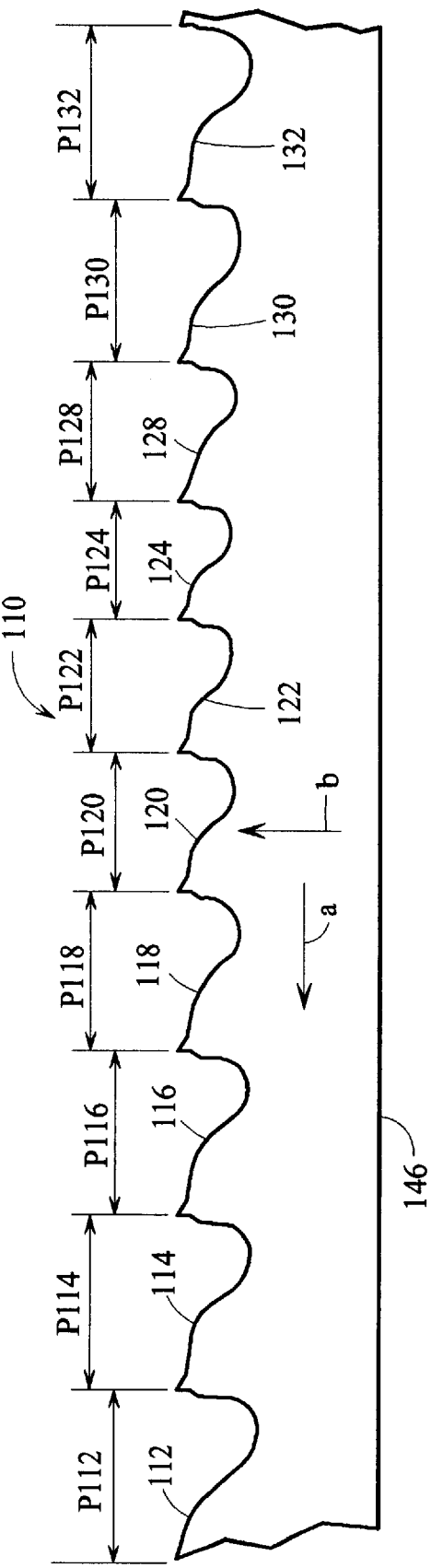
FIG. 5 is a somewhat schematic, side elevational view of another embodiment of a structural band saw blade of the present invention.
Figure 6:
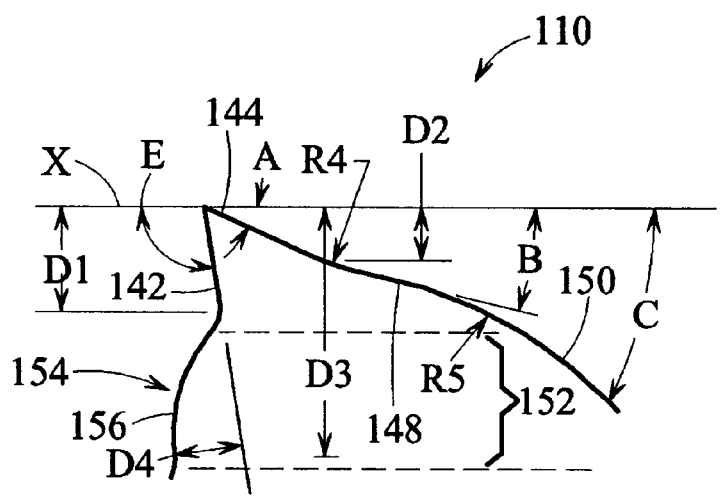
FIG. 6 is an enlarged, partial side elevational view of the band saw blade of FIG. 5 illustrating in further detail a typical tooth configuration of the band saw blade.
Figure 7:
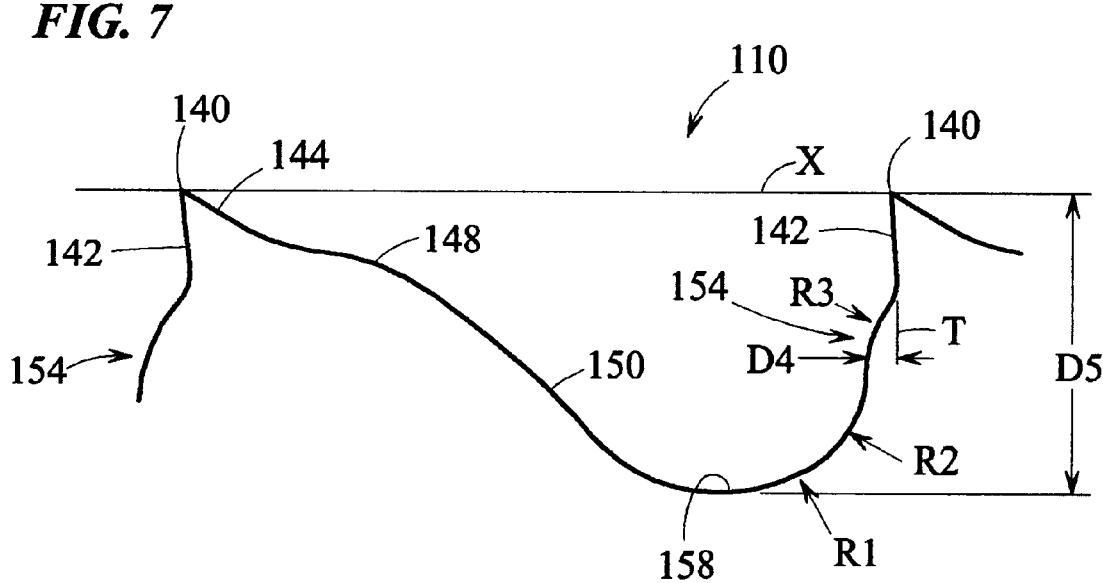
FIG. 7 is an enlarged, partial side elevational view of the band saw blade of FIG. 5 further illustrating a typical tooth configuration of the band saw blade.

Turning to FIGS. 5 through 7, another band saw blade embodying the present invention is indicated generally by the reference numeral 110. The band saw blade 110 defines essentially the same construction as the band saw blade 10 described above, and like reference numerals preceded by the numeral "1" are used to indicate like elements. The primary difference of the band saw blade 110 is that it defines a ten (10) tooth variable pitch pattern with an oscillation sequence as follows: S-RL-LH-RH-LL-S-H-LL-S . . . . This oscillation sequence is based on the 5 teeth set scheme set forth in U.S. Pat. No. 5,410,935, which is assigned to the Assignee of the present invention, and is hereby expressly incorporated by reference as part of the present disclosure. The Pitch Distance, radii R1, R2 and R3 (FIG. 7), and the thickness D4 of the rake face protrusion 154 normal to the plane of the rake face for each tooth in the embodiment of FIGS. 5 through 7, are as follows:

| Tooth # | Pitch | R1 | R2 | R3 | D4 |
| --- | --- | --- | --- | --- | --- |
| 112 | 0.260 | 0.055 | 0.060 | 0.030 | 0.010 |
| 114 | 0.241 | 0.052 | 0.056 | 0.030 | 0.010 |
| 116 | 0.231 | 0.055 | 0.038 | 0.030 | 0.010 |
| 118 | 0.212 | 0.050 | 0.033 | 0.030 | 0.010 |
| 120 | 0.203 | 0.050 | 0.035 | 0.030 | 0.010 |
| 122 | 0.184 | 0.045 | 0.025 | 0.035 | 0.009 |
| 124 | 0.175 | 0.040 | 0.025 | 0.035 | 0.009 |
| 126 | 0.193 | 0.045 | 0.033 | 0.030 | 0.010 |
| 128 | 0.222 | 0.054 | 0.035 | 0.030 | 0.010 |
| 130 | 0.250 | 0.058 | 0.050 | 0.030 | 0.010 |

The relief angles A, B and C are preferably the same as described above in connection with the FIGS. 1 through 4. In addition, with reference to FIG. 6, the radius R4 between the primary clearance surface 144 and secondary clearance surface 148 is approximately 0.06 inch, and the radius R5 between the secondary clearance surface 148 and tertiary clearance surface 150 is approximately 0.08 inch. The length D1 of the rake proximately 0.023 inch, and the rake angle E is approximately 98° (or 8° relative to a normal to the plane extending between the tips of unset teeth). However, as may be recognized by those skilled in the pertinent art, these angles and dimensions are only exemplary, and may be changed as desired or required by the particular blade and/or application.

As may be further recognized by those skilled in the pertinent art based on the teachings herein, the multi-pitch, oscillating set patterns of the present invention are equally applicable to any of numerous other pitch and/or set patterns. For example, another embodiment of the present invention employs a nine tooth pitch pattern with the oscillating nine-tooth set pattern as described above.

One advantage of the present invention is that the rake face protrusion 54, 154 in combination with the locations of the secondary and tertiary clearance surfaces 48, 148 and 50, 150, respectively, as defined by the second and third acute clearance angles "B" and "C", respectively, provide a substantially increased tooth cross-sectional width or thickness at the weld zone in comparison to prior art structural band saw blades and, in turn, provide substantially improved resistance to tooth strippage in comparison to such prior art blades. In the currently preferred embodiments of the present invention, these features increase the length of the weld zone (or the width of the tooth) as much as 25% to 75% over prior art tooth geometries. In addition, the rake face protrusion 54 itself increases the length of the weld zone as much as 15% to 40% over that of prior art tooth geometries.

Accordingly, the relatively long weld zone interface of the present invention provides superior mechanical properties at the weakest location of the tooth where tooth stripping typically occurs in interrupted cut applications. Another advantage of these features of the present invention is that the wider tooth geometry increases tooth stiffness, which in turn minimizes blade vibration and chatter, and the resultant inconsistent tooth loading associated with such blade vibration and chatter.

Another advantage of the present invention is that the primary rake angles "E", primary acute clearances angles "A", and tooth tip included angles "D" of the present invention, provide a balance between the requirements of having a relatively robust tooth for structural integrity and preventing tooth strippage, and having a positive rake for reduced cutting forces.

Yet another advantage of the present invention is that the rake face protrusion tends to direct the heated chips outwardly and away from the rake face to thereby minimize heat transfer into the blade and prevent premature flank and crater wear. These features of the present invention likewise facilitate in preventing chip curls from becoming welded to the cutting edges of the blade, and in turn fracturing the blade, as encountered with the prior art band saw blades described above.

As described above, the variable pitch patterns of the present invention further minimize vibration by mixing up the "forcing frequencies" as each tooth enters and leaves the work piece. In addition, the oscillating pattern of set magnitudes further minimizes vibration by varying the magnitude of different "torque loads" exerted on the blade as each set tooth enters the work piece. The degree to which each tooth is set (i.e., light or heavy) dictates the degree of torque (or twist off centerline) to which the blade is subjected. Uniform repeated twist loading of this type leads to vibratory motion with increased noise and a resulting decrease in blade life. Accordingly, the oscillating set patterns of the present invention prevent such uniform twist loading by providing a random or variable torque load, and thereby significantly reduce the vibration and noise that might otherwise result from such loading and, in turn, increase blade life over comparable prior art structural band saw blades.

Another advantage of the present invention is that the relatively rapid pitch transition as described above, in combination with the five unique cutting planes established by the variable level or height of the teeth sets, allows for more uniform tooth loading and chip formation in comparison to prior art structural band saw blades. This multi-plane cutting concept provides for more efficient cutting by creating chips that are relatively thick and narrow with a minimized shear plane as defined by the blade feed trajectory. Such relatively narrow, deep cuts operate to reduce the torque on the blade, further reduce noise and vibration, and correspondingly improve blade life.

As may be recognized by those of ordinary skill in the pertinent art based on the teachings herein, numerous changes and modifications may be made to the above-described and other embodiments of the present invention without departing from its scope as defined in the appended claims. For example, the teeth may take any of numerous different sets, pitches, set patterns, and/or pitch patterns other than those specifically disclosed herein. In addition, each tooth may define more than one rake face. Similarly, the blade need not define any unset teeth; rather, all teeth may be either "left" or "right" set, preferably in accordance with an oscillating set pattern the same or similar to that described above. In addition, the primary, secondary and/or tertiary clearance surfaces need not define straight surfaces, but rather one or more of these surfaces may define a curvilinear surface profile. Furthermore, although the currently preferred embodiments of the present invention are band saw blades, the teachings of the present invention may be applicable to any of numerous other types of saw blades, such as jig saw blades, reciprocating saw blades, hack saw blades, hole saw blades and circular saw blades. Accordingly, this detailed description of preferred embodiments is to be taken in an illustrative as opposed to a limiting sense.

What is claimed is:

1. A saw blade, comprising:
   a cutting edge defined by a plurality of teeth spaced relative to each other, each tooth including:
   a tip;
   a rake face formed on one side of the tip;
   a primary clearance surface formed on the opposite side of the tip relative to the rake face and defining a primary acute relief angle;
   a secondary clearance surface formed on the opposite side of the primary clearance surface relative to the tip and defining a secondary acute relief angle that is less than the primary acute relief angle;
   a tertiary clearance surface formed on the opposite side of the secondary clearance surface relative to the first clearance surface, and defining a tertiary acute relief angle that is greater than the primary and secondary relief angles;
   a weld zone formed on the opposite side of the rake face relative to the tip and extending in an elongated direction of the blade from approximately one side of the tooth to the other; and
   a rake face protrusion formed on the opposite side of the rake face relative to the tip and extending over one end of the weld zone, wherein the rake face protrusion projects outwardly relative to a plane defined by the rake face, the secondary and tertiary clearance surfaces project outwardly on the opposite side of the tooth relative to the rake face protrusion, and at least one of the secondary and tertiary clearance surfaces extends over the weld zone on the opposite side of the tooth relative to the rake face protrusion to thereby form an increased tooth thickness at the weld zone.

2. A saw blade as defined in claim 1, wherein the primary acute relief angle is within the range of approximately 20° through approximately 35°.

3. A saw blade as defined in claim 1, wherein the secondary acute relief angle is within the range of approximately 5° through approximately 20°.

4. A saw blade as defined in claim 1, wherein the tertiary relief angle is within the range of approximately 40° through approximately 55°.

5. A saw blade as defined in claim 1, wherein each tooth defines a tooth tip included angle defined between the primary clearance surface and the rake face, and the tooth tip included angle is within the range of approximately 45° through approximately 65°.

6. A saw blade as defined in claim 1, wherein the rake face defines a length extending between the tip and rake face protrusion within the range of approximately 0.01 inch through approximately 0.04 inch.

7. A saw blade as defined in claim 1, wherein the secondary clearance surface defines a first end adjacent to the primary clearance surface, and a second end adjacent to the tertiary clearance surface, and the first end of the secondary clearance surface is spaced at a depth below a cutting plane of the tip of an unset tooth within the range of approximately 0.01 inch through approximately 0.03 inch.

8. As saw blade as defined in claim 1, wherein the rake face protrusion defines a surface area of maximum projection relative to said plane of the rake face, and said surface area of maximum projection is spaced at a depth below a cutting plane of the tip of an unset tooth within the range of approximately 0.03 inch through approximately 0.1 inch.

9. A saw blade as defined in claim 8, wherein the depth of the surface area of maximum projection is within the range of approximately 0.045 inch through approximately 0.075 inch.

10. A saw blade as defined in claim 1, wherein the rake face protrusion defines a thickness normal to a plane of the rake face within the range of approximately 0.005 inch through approximately 0.06 inch.

11. A saw blade as defined in claim 10, wherein the thickness of the rake face protrusion is within the range of approximately 0.005 inch through approximately 0.04 inch.

12. A saw blade as defined in claim 1, wherein each tooth defines a gullet located on an opposite side of the rake face protrusion relative to the tip, each gullet defines a depth between a bottom surface of the gullet and the tip of the tooth, each tooth further defines a pitch distance between the tips of successive teeth, and for each tooth the gullet depth is at least approximately 40% of the pitch distance.

13. A saw blade as defined in claim 1, wherein the rake face defines an acute rake angle relative to a normal to a plane extending between the tips of unset teeth, and the acute rake angle is within the range of approximately 5° through approximately 10°.

14. A saw blade as defined in claim 1, wherein the plurality of teeth define a pitch pattern of at least nine teeth.

15. A saw blade as defined in claim 14, wherein the tooth pitch pattern is at least 14 teeth, and each pitch pattern defines at least approximately 12 different pitch distances.

16. A saw blade as defined in claim 14, wherein the saw blade defines a pitch pattern of a least 9 teeth, and at least one oscillating set pattern within each pitch pattern.

17. A saw blade as defined in claim 1, wherein the teeth define an oscillating set pattern wherein successive teeth of like set direction are set at different angles relative to a plane of symmetry in comparison to each other.

18. A saw blade as defined in claim 17, wherein the teeth define a variable level height and set pattern.

19. A saw blade as defined in claim 1, wherein each tooth further defines a gullet formed on the opposite side of the rake face protrusion relative to the rake face, and a line of tangency formed between the rake face protrusion and the gullet, and wherein the line of tangency is within approximately 5° of the normal to a plane extending between the tips of at least two unset teeth.

20. A saw blade as defined in claim 1, wherein the rake face protrusion defines a substantially convex profile.

21. A saw blade as defined in claim 1, wherein the rake face protrusion defined a substantially convex profile.

22. A saw blade, comprising:
 a cutting edge defined by a plurality of teeth spaced relative to each other, each tooth including:
  a tip;
  a rake face formed on one side of the tip;
  a primary clearance surface formed on the opposite side of the tip relative to the rake face and defining a primary acute relief angle;
  a weld zone formed on the opposite side of the rake face relative to the tip and extending in an elongated direction of the blade from approximately one side of the tooth to the other; and
  first means formed on the opposite side of the rake face relative to the tip and extending over one end of the weld zone and projecting outwardly relative to a plane defined by the rake face for increasing the width of the tooth at the weld zone and improving the resistance to tooth stripping; and
  second means projecting outwardly on the opposite side of the tooth relative to the first means and extending over the weld zone on the opposite side of the tooth relative to the first means for further increasing the width of the tooth at the weld zone and improving the resistance to tooth strippage.

23. A saw blade as defined in claim 22, wherein the teeth define a variable level height and set pattern.

24. A saw blade as defined in claim 22, wherein the first means is defined by a rake face protrusion formed on the opposite side of the rake face relative to the tip, extending over one end of the weld zone, and projecting outwardly relative to a plane defined by the rake face.

25. A saw blade as defined in claim 22, wherein the second means is defined by a secondary clearance surface formed on the opposite side of the primary clearance surface relative to the tip and defining a secondary acute relief angle that is less than the primary acute relief angle, and extending over the weld zone on the opposite side of the tooth relative to the first means to thereby form an increased tooth thickness at the weld zone.

26. A saw blade as defined in claim 22, wherein each tooth includes a secondary clearance surface formed on the opposite side of the primary clearance surface relative to the tip and defining a secondary acute relief angle that is less than the primary acute relief angle, and wherein the second means is defined by a tertiary clearance surface formed on the opposite side of the secondary clearance surface relative to the first clearance surface, and defining a tertiary acute relief angle that is greater than the primary and secondary relief angles, and extending over the weld zone on the opposite side of the tooth relative to the first means to thereby form an increased tooth thickness at the weld zone.

27. A saw blade as defined in claim 22, wherein each tooth further defines a gullet formed on the opposite side of the first means relative to the rake face, and a line of tangency formed between the first means and the gullet, and wherein the line of tangency is within approximately 5° of the normal to a plane extending between the tips of at least two unset teeth.

28. A saw blade, comprising:
 a cutting edge defined by a plurality of teeth spaced relative to each other, each tooth including:
  a tip;
  a rake face formed on one side of the tip;
  a primary clearance surface formed on the opposite side of the tip relative to the rake face and defining a primary acute relief angle;
  a weld zone formed on the opposite side of the rake face relative to the tip and extending in an elongated direction of the blade from approximately one side of the tooth to the other; and
  means formed on the opposite side of the rake face relative to the tip, extending over at least the end of the weld zone adjacent to the rake face, and projecting outwardly relative to a plane defined by the rake face for increasing the width of the tooth at the weld zone and improving the resistance to tooth stripping; and
 wherein the plurality of teeth define a variable level height and set pattern.

29. A saw blade as defined in claim 28, wherein the means for improving the resistance to tooth strippage is defined by a rake face protrusion formed on the opposite side of the rake face relative to the tip, extending over one end of the weld zone, and projecting outwardly relative to a plane defined by the rake face.

30. A saw blade as defined in claim 29, wherein the means for improving the resistance to tooth strippage is further defined by a secondary clearance surface formed on the opposite side of the primary clearance surface relative to the tip and defining a secondary acute relief angle that is less than the primary acute relief angle, and extending over the weld zone on the opposite side of the tooth relative to the rake face protrusion to thereby form an increased tooth thickness at the weld zone.

31. A saw blade as defined in claim 29, wherein each tooth includes a secondary clearance surface formed on the opposite side of the primary clearance surface relative to the tip and defining a secondary acute relief angle that is less than the primary acute relief angle, and wherein the means for improving the resistance to tooth strippage is further defined by a tertiary clearance surface formed on the opposite side of the secondary clearance surface relative to the first clearance surface, and defining a tertiary acute relief angle that is greater than the primary and secondary relief angles, and extending over the weld zone on the opposite side of the tooth relative to the rake face protrusion to thereby form an increased tooth thickness at the weld zone.

32. A saw blade as defined in claim 28, wherein each tooth further defines a gullet formed on the opposite side of the means for improving the resistance to tooth strippage relative to the rake face, and a line of tangency formed between said means and the gullet, and wherein the line of tangency is within approximately 5° of the normal to a plane extending between the tips of at least two unset teeth.

33. A saw blade as defined in claim 28, wherein the variable level height and set pattern is defined by a plurality of right set teeth set to the right of a plane of symmetry, and a plurality of left set teeth set to the left of the plane of symmetry, and wherein a first plurality of the right and left set teeth are each set at a first acute angle relative to the plane of symmetry, and a second plurality of the right and left set teeth are each set at a second acute angle relative to the plane of symmetry that is less than the first acute angle.

34. A saw blade as defined in claim 33, wherein the first acute angle is within the range of approximately 6° through approximately 20°, and the second acute angle is within the range of approximately 2° through approximately 12 °.

35. A saw blade, comprising:
   a cutting edge defined by a plurality of teeth spaced relative to each other, each tooth including:
   a tip;
   a rake face formed on one side of the tip;
   at least one clearance surface formed on the opposite side of the tip relative to the rake face and defining at least one relief angle;
   a rake face protrusion formed on the opposite side of the rake face relative to the tip, wherein the rake face protrusion defines a substantially curvilinear profile, projects outwardly relative to a plane defined by the rake face, and defines a surface area of maximum projection relative to said plane of the rake face, and wherein said surface area of maximum projection is spaced at a depth below a cutting plane of the tip of an unset tooth within the range of approximately 0.03 inch through approximately 0.1 inch.

36. A saw blade as defined in claim 35, wherein the depth of the surface area of maximum projection is within the range of approximately 0.045 inch through approximately 0.075 inch.

37. A saw blade as defined in claim 35, wherein the rake face protrusion defines a substantially convex profile.

38. A saw blade as defined in claim 35, wherein the profile of the rake face protrusion is defined by a radius of curvature.

39. A saw blade as defined in claim 35, including:
   a primary clearance surface formed on the opposite side of the tip relative to the rake face and defining a primary acute relief angle;
   a secondary clearance surface formed on the opposite side of the primary clearance surface relative to the tip and defining a secondary acute relief angle that is less than the primary acute relief angle;
   a tertiary clearance surface formed on the opposite side of the secondary clearance surface relative to the first clearance surface, and defining a tertiary acute relief angle that is greater than the primary and secondary relief angles; and
   a weld zone formed on the opposite side of the rake face relative to the tip and extending in an elongated direction of the blade from approximately one side of the tooth to the other; and
   wherein the rake face protrusion extends over one end of the weld zone, the secondary and tertiary clearance surfaces project outwardly on the opposite side of the tooth relative to the rake face protrusion, and at least one of the secondary and tertiary clearance surfaces extends over the weld zone on the opposite side of the tooth relative to the rake face protrusion to thereby form an increased tooth thickness at the weld zone.

40. A saw blade as defined in claim 35, wherein the rake face protrusion defines a thickness normal to a plane of the rake face within the range of approximately 0.005 inch through approximately 0.06 inch.

41. A saw blade as defined in claim 35, wherein the teeth define a variable level height and set pattern.

42. A saw blade as defined in claim 41, wherein the variable level height and set pattern is defined by a plurality of right set teeth set to the right of a plane of symmetry, and a plurality of left set teeth to the left of the plane of symmetry, and wherein a first plurality of the right and left set teeth are each set at a first acute angel relative to the plane of symmetry, and a second plurality of symmetry that is less than the first acute angel.

* * * * *

UNITED STATES PATENT AND TRADEMARK OFFICE
CERTIFICATE OF CORRECTION

PATENT NO. : 6,601,495 B2
DATED : August 5, 2003
INVENTOR(S) : Mark T. Cranna

It is certified that error appears in the above-identified patent and that said Letters Patent is hereby corrected as shown below:

Column 13,
Line 13, delete the word "convex" and replace it with the word -- curvilinear --.
Line 15, delete the word "claim 1" and replace it with the word -- claim 20 --.
Line 15, delete the word "defined" and replace it with the word -- defines --.

Column 16,
Lines 34 and 36, delete two instances of the word "angel" and replace them with the word -- angle --.
Line 35, insert the words -- the right and left set teeth are each set at a second acute angle relative to the plane of -- between the words "of" and "symmetry".

Signed and Sealed this

Twenty-third Day of March, 2004

JON W. DUDAS
*Acting Director of the United States Patent and Trademark Office*